Dec. 20, 1949     J. F. DENSMORE     2,491,718
LIFTING JACK

Filed April 29, 1946     2 Sheets-Sheet 1

INVENTOR.
JOHN F. DENSMORE,
BY *Victor J. Evans & Co.*
ATTORNEYS

Dec. 20, 1949    J. F. DENSMORE    2,491,718
LIFTING JACK

Filed April 29, 1946    2 Sheets-Sheet 2

INVENTOR.
JOHN F. DENSMORE,
BY *Victor J. Evans & Co.*
ATTORNEYS

Patented Dec. 20, 1949

2,491,718

UNITED STATES PATENT OFFICE 2,491,718

LIFTING JACK

John F. Densmore, Hanover, N. H.

Application April 29, 1946, Serial No. 665,733

2 Claims. (Cl. 254—88)

This invention relates to improvements in devices for jacking the wheels of automobiles or other vehicles for the purpose of changing tires and the like.

The usual jacking devices which require manual effort are inconvenient and annoying at times, especially with the modern type of automobile which is slung low and does not enable easy positioning of a jack.

It is, therefore, an object of this invention to provide a jacking device by means of which the power is derived from the motor of the automobile to perform the jacking operation.

A further object is the provision of a jacking device whereby the axle of an automobile is raised by an inclined member, the device being collapsible and capable of being conveniently carried in a trunk or under the seat of the usual automobile.

These and other objects are attained by the novel arrangement and construction of parts hereinafter described and illustrated by the accompanying drawings, forming a part hereof, and in which.

Figure 1:
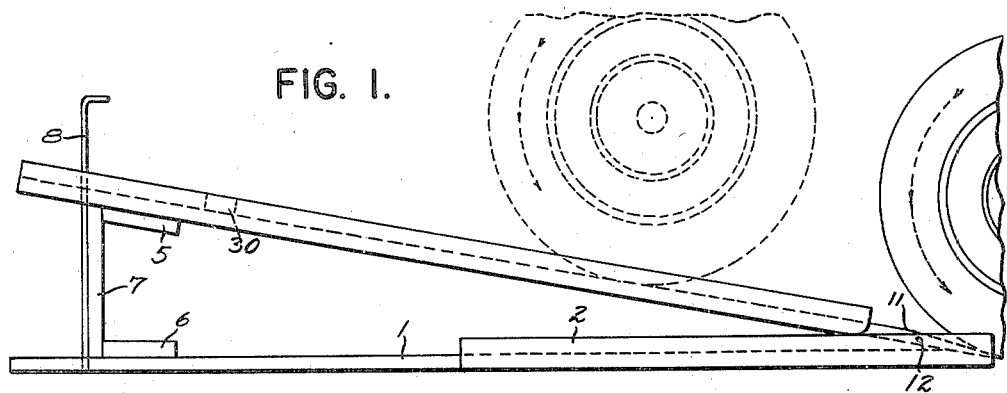
Fig. 1 is an elevational view of a jacking device embodying the invention.

Referring to the drawings, the jacking device is shown to comprise a base plate 1 having side walls 2, and an inclined runway 3 with side walls 4 to guide a tire. The runway 3 is of sufficient width to accommodate the average automobile tire, and rests on the base plate 1, the runway 3 having its forward end bevelled at 11 to enable a wheel to ride easily thereon.

Attached to the underside of runway 3 is a bar 5 and attached to the upper side of plate 1 is a bar 6, the bars 5 and 6 cooperating with a strut 7 to hold one end of the runway in a raised position. A pin 8 passes through the runway 3 and the base plate 1 and holds the strut in position.

Figure 7:
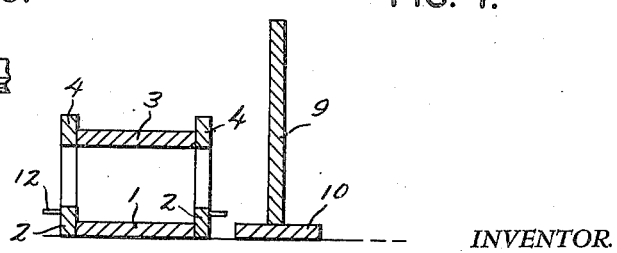
Fig. 7 is a sectional view taken on the line 7—7 of Fig. 2.

Positioned alongside of the plate 1 and runway 3 is a plate 10 having an upstanding plate 9 with an inclined upper edge. (See Fig. 7.)

Figure 2:
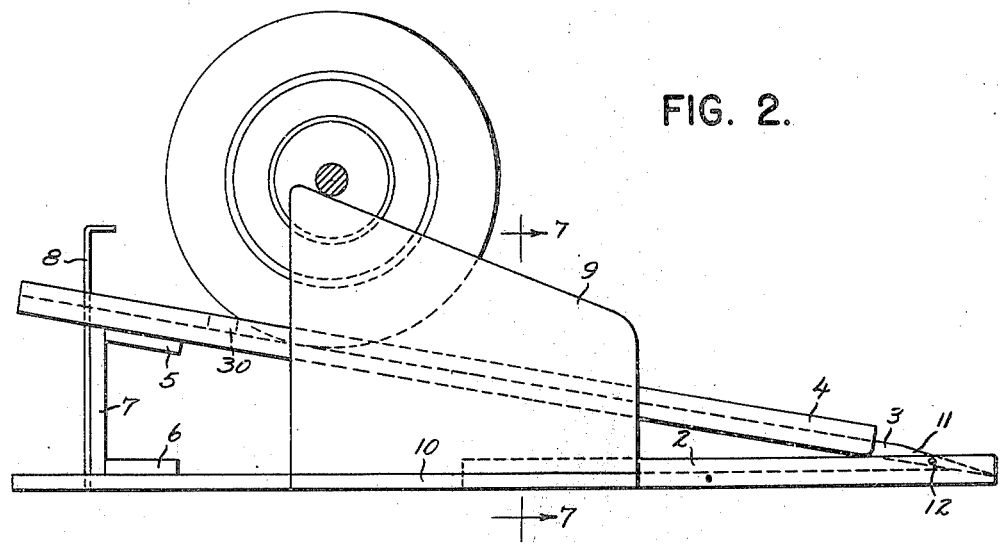
Fig. 2 is an elevational view showing the axle of an automobile raised by an inclined member.
Figure 3:
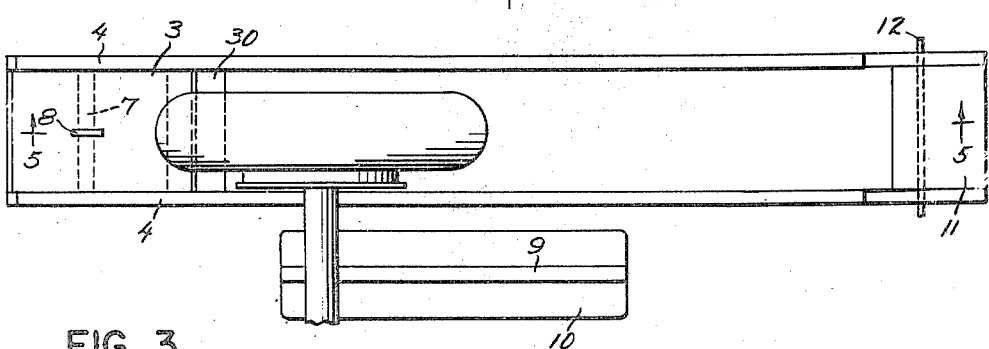
Fig. 3 is a plan view of the jacking device.
Figure 4:
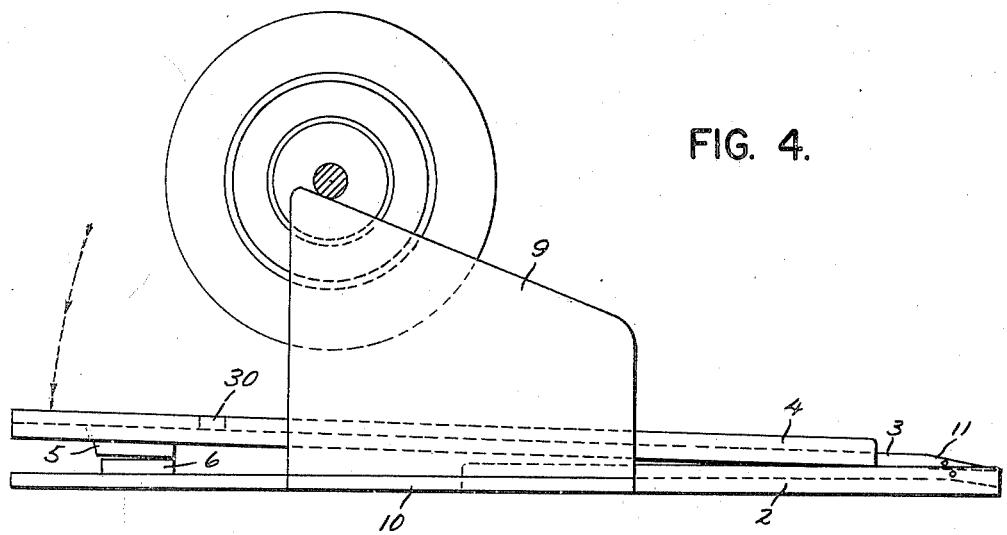
Fig. 4 is an elevational view showing the manner in which the device can be collapsed when the wheel has been raised.
Figure 5:
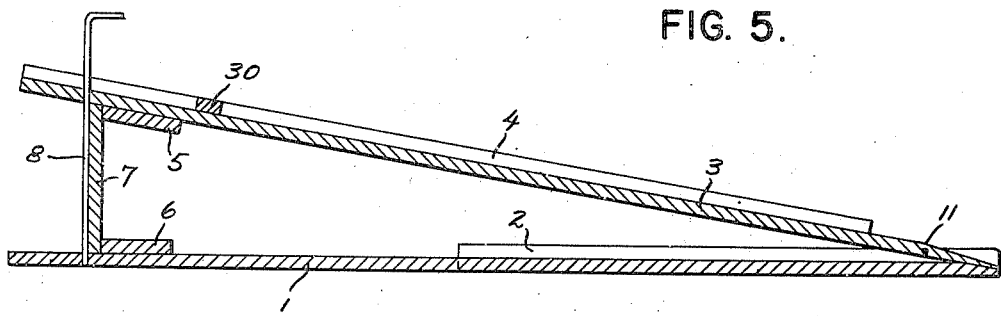
Fig. 5 is an elevational view of a runway used in the device.
Figure 6:
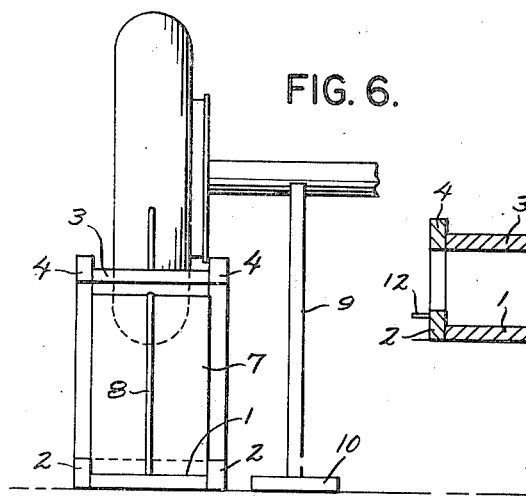
Fig. 6 is an end view of the jacking device.

In operation, when it is desired to jack a wheel, the motor of the automobile is started and the wheel is driven on the runway 3. The forward movement of the wheel is limited by block 30 on runway 3. (See Figs. 1 and 2.) When the wheel has reached a position as shown in Fig. 2, the plate 9 having the inclined upper edge is wedged tightly under the axle of the automobile. The runway and base plate 1 are then collapsed as indicated in Fig. 4, and can then be removed. The runway and base plate are collapsed simply by removing pin 8 and strut 7.

The forward ends of the base plate 1 and runway 3 are pivotally secured together by a pin 12. (See Fig. 2.)

From the above description it will be seen that there has been provided a simple and effective jacking device for quickly and conveniently raising a wheel, without requiring manual effort, to change a tire or perform any other necessary operations.

The above description is to be considered as illustrative and not limitative of the invention, of which modifications can be made without departing from the scope and spirit of the invention as set forth in the appended claims.

The invention having been described, what is claimed is:

1. A jacking device, comprising a base plate having a bar at one end thereof, a runway having a bar at one end thereof opposite to the first mentioned bar, a strut coacting with said bars to hold one end of the runway in a raised position, a pin passing through the runway and base plate to hold the strut in position, a pin at the other end of the base plate and runway holding them together, and a vertical plate having an inclined upper edge adapted to be wedged under the axle of an automobile when the wheel is in raised position on the runway.

2. In a jacking device, a base plate having side guide walls, a runway having side guide walls and pivotally connected at one end to the base plate, a bar on the underside of the runway and a bar on the upper side of the base plate at the other end thereof, a strut abutting said bars to hold the runway in an inclined position, a pin passing vertically through the runway and base plate and engaging the strut to hold the strut in position, and an upstanding plate having an inclined upper edge adapted to be wedged under the axle of an automobile when the wheel is in raised position on the runway.

JOHN F. DENSMORE.

REFERENCES CITED

The following references are of record in the file of this patent:

UNITED STATES PATENTS

| Number | Name | Date |
| --- | --- | --- |
| 1,929,572 | Weller | Oct. 10, 1933 |
| 2,227,750 | Hinson | Jan. 7, 1941 |